No. 678,187. Patented July 9, 1901.
C. C. LEARY.
CHECK ROW PLANTER.
(Application filed Dec. 21, 1900.)
(No Model.) 3 Sheets—Sheet 1.
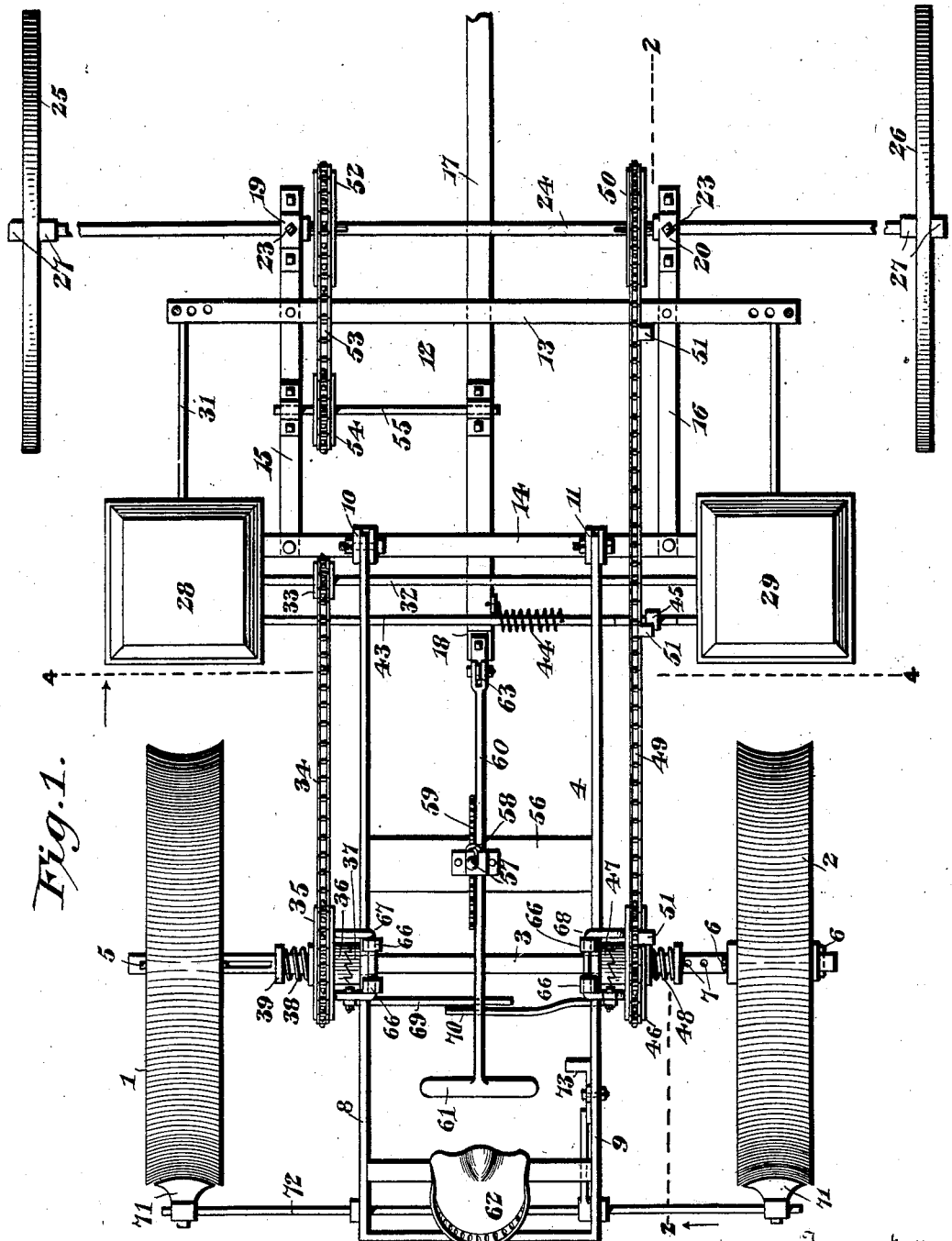
Charles C. Leary, Inventor
Witnesses No. 678,187. Patented July 9, 1901.
C. C. LEARY.
CHECK ROW PLANTER.
(Application filed Dec. 21, 1900.)
(No Model.) 3 Sheets—Sheet 2.
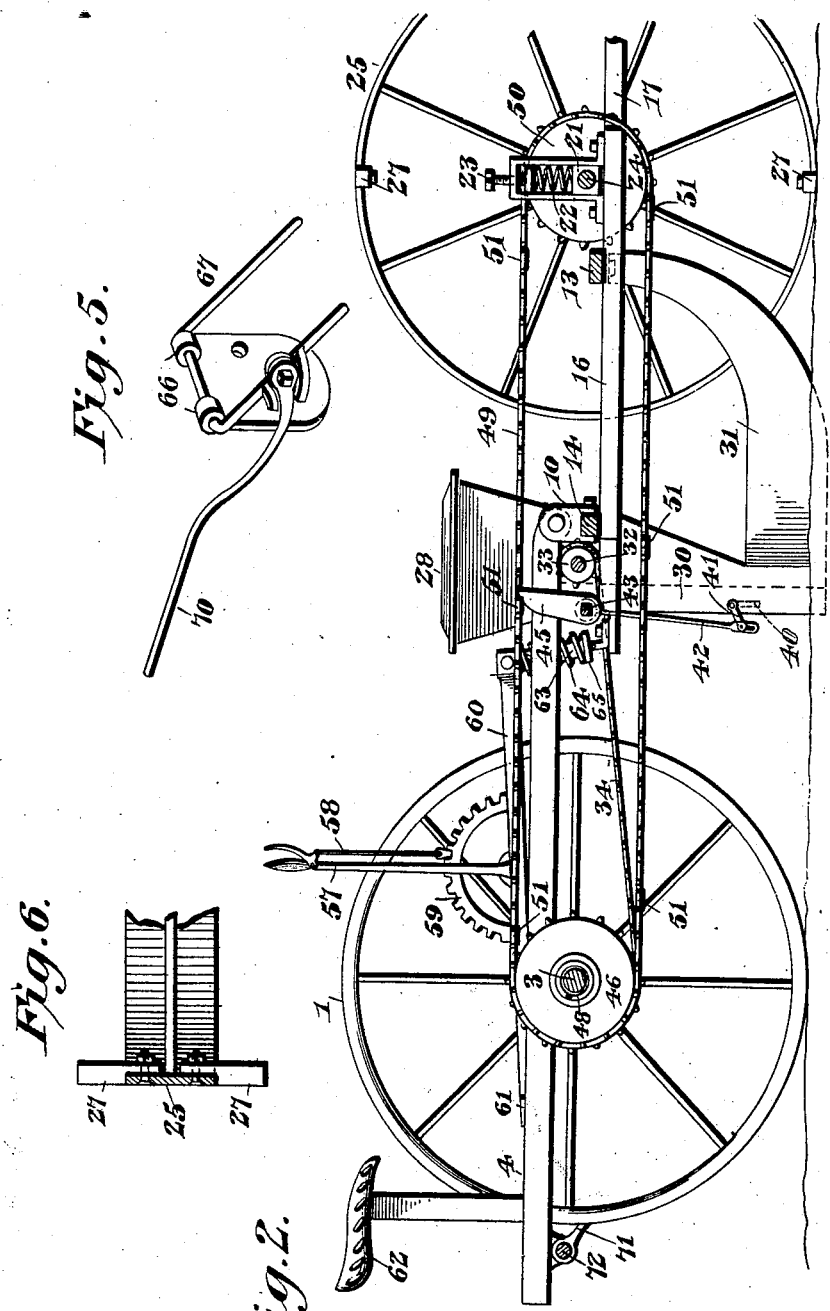
Charles C. Leary,
Inventor
Witnesses

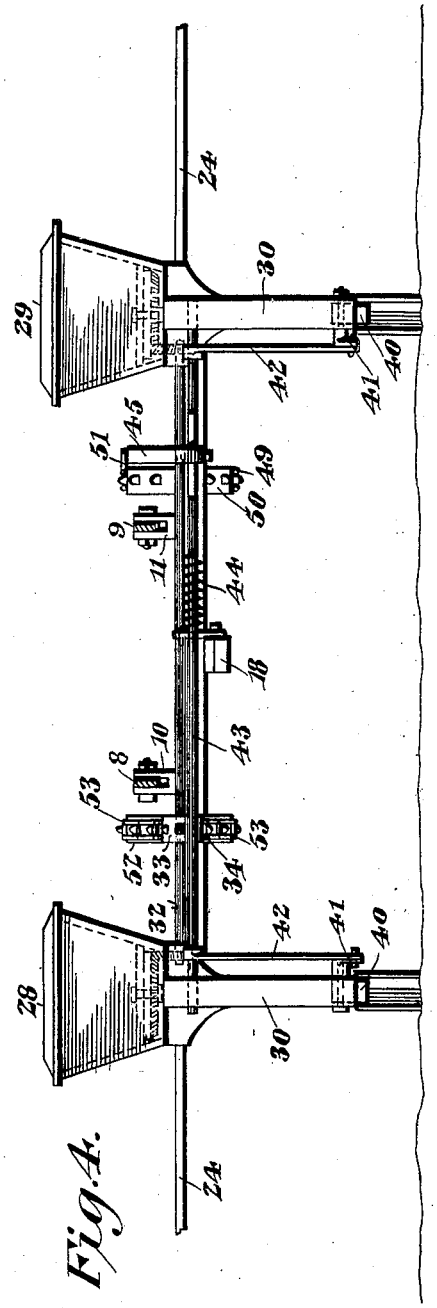

UNITED STATES PATENT OFFICE.

CHARLES C. LEARY, OF BELMORE, OHIO.

CHECK-ROW PLANTER.

SPECIFICATION forming part of Letters Patent No. 678,187, dated July 9, 1901.

Application filed December 21, 1900. Serial No. 40,655. (No model.)

*To all whom it may concern:*

Be it known that I, CHARLES C. LEARY, a citizen of the United States, residing at Belmore, in the county of Putnam and State of Ohio, have invented a new and useful Check-Row Planter, of which the following is a specification.

This invention relates to a novel check-row planter, and has for one object the production of a simple, durable, and highly-effective agricultural implement or machine by means of which corn or other seeds may be planted with convenience and facility and in that orderly and well-spaced relation which is essential to the economical utilization of the ground.

A further object of the invention is to equip a planter of this character with novel means for effectually timing the dropping mechanism in unison with the markers or other checking devices, so that the feed-valve, adjacent to the foot of each dropper-tube, will be opened to deposit the grain just as the checking devices carried by the marking-wheels reach the ground to check or imprint the latter for the guidance of the operator when planting the next or succeeding row.

A further object of the invention is to so organize the frame of the machine that the driver may be enabled to elevate the planting mechanism out of its operative position and simultaneously disconnect the feed devices and dropping mechanism from the driving-shaft whenever it is desirable to transport the machine from one point of use to another or to make a turn without planting.

Further and subordinate objects of the invention will appear more fully hereinafter as the necessity for their accomplishment is developed in the succeeding description of the preferred form of my invention, which I have clearly illustrated in the accompanying drawings.

In said drawings, Figure 1 is a plan view of my machine complete. Fig. 2 is a longitudinal sectional view on the line 2 2 of Fig. 1. Fig. 3 is a central longitudinal sectional view through the machine complete. Fig. 4 is a transverse sectional view on the line 4 4 of Fig. 1. Fig. 5 is a detail view of the mechanism employed for throwing the driving-sprockets out of engagement with the driving-shaft; and Fig. 6 is a detail view of a portion of one of the marker-wheels, showing the construction and manner of attachment of the check-blocks.

Referring to the numerals employed to designate corresponding parts throughout the views, 1 and 2 indicate the carrying-wheels of my device, supporting a carrying and driving shaft or axle 3, which in turn supports the main or wheel frame 4, mounted to rock upon the shaft 3 in a manner well understood in the art. The carrying-wheel 1 is mounted for rotation with the shaft 3—as, for instance, by the interposition between the wheel and shaft of a wedge-shaped spline 5, which while holding the wheel 1 rigid with the shaft in order to drive the latter by the traction of the wheel permits the wheel to be adjusted toward or from the end of the shaft for a purpose to be hereinafter made plain. The wheel 2, unlike the wheel 1, is mounted for free rotation upon the shaft, but is designed to be retained at any desired distance from the end thereof by means of cotter-keys 6, located, as desired, by being passed through the shaft 3, provided with a series of openings 7 for their reception.

The main frame 4 of the machine extends upon opposite sides of the shaft 3 and is pivotally secured at the front ends of its side rails 8 and 9, set between the upstanding ears or bearing-brackets 10 and 11 of a second frame, which for the purpose of convenient designation I shall term the "planter" or "runner" frame of the machine.

The planter or runner frame (designated by the numeral 12) comprises the front and rear frame-bars 13 and 14, from the latter of which the ears 10 and 11 extend, the side bars 15 and 16 connecting the front and rear bars, and a draft tongue or pole 17 secured to the frame-bars 13 and 14 and having its rear end 18 extended rearwardly between the bars 8 and 9 of the main frame 4.

It will be observed that the planter-frame is supported at its rear end by the forward end of the main frame 4, and it is obvious that some means must be provided for the support of the front end of the frame 12. I therefore provide each of the side bars 15 and 16 of the planter-frame with upstanding bearing-frames 19 and 20, within which are mounted for vertical movement the bearing-boxes 21, between which and the upper ends of the frames 19 and 20 are interposed stout springs 22, the tension of each of which is regulated by means of a compression-screw 23, disposed in the upper end of each frame and bearing against the spring. The bearing-boxes 21 serve as yielding bearings for a transverse supporting-rod or marker-shaft 24, extended suitable distances beyond the opposite sides of the frame and provided with marker-wheels 25 and 26, having attached at predetermined points upon their rims the check-blocks 27, designed as the planter is drawn over the ground to mark or check the ground for the guidance of the operator in planting succeeding rows in their proper orderly arrangement.

It will now appear that I have a check-row planter comprising front and rear wheels supporting front and rear shafts, which in turn sustain a pair of frames having pivotal connection at a point intermediate of the shafts, and also that the front wheels are employed as rotary markers. It will therefore appear that in order to complete the device I must have properly-positioned feed-boxes and dropping mechanism and means for regulating or timing the dropping mechanism with relation to the checking devices and also means for raising and lowering the front frame when it is desired to transport the machine from one point of use to another.

The feed boxes or hoppers 28 and 29, equipped with suitable feed mechanism, (not illustrated,) are supported upon the outer ends of the rear frame-bar 14 of the planter-frame and are provided, as usual, with the depending drill-tubes 30, fixed at their lower ends to the runners or furrow-openers 31, extended forwardly, and upwardly curved for attachment to the outer ends of the front frame-bar 13, as illustrated in the drawings. The feed-boxes, runners, and connected parts may be adjusted toward or from each other in a manner well understood in the art for the purpose of regulating the distance between the rows being planted. The feed mechanism in each of the seed boxes or hoppers is operated by a rotary feed-shaft 32, provided with a sprocket-wheel 33, geared, as by means of a sprocket-chain 34, to what may be termed a "feed-sprocket" 35, loosely mounted upon the driving-shaft 3 at one side of the frame 4 and having its hub 36 formed with a clutch-face for engagement with a clutch-collar 37, keyed upon the shaft 3. The sprocket 35 is normally urged laterally for the purpose of engaging the clutch by means of a spring 38, bearing at its opposite end against a collar 39, fixed to the shaft.

The feed mechanism to which reference has been made and which is driven from the sprocket 35 controls the quantity of corn or other seed fed from the seedboxes into the drill-tubes in a manner well understood in the art; but the dropping of the seeds into the furrow is controlled by means of valves 40, disposed in each tube adjacent to its lower end and provided, respectively, with valve-arms 41, engaging the slotted lower ends of valve-levers 42, supported and fulcrumed by what may be termed a "dropper-shaft" 43, extending transversely across the machine and normally urged by a return-spring 44 to a position which will close the valves 40 and prevent the seed within the tubes 30 from being deposited in the ground. The upper end of one valve-lever 42 constitutes an actuator or trip-arm 45, which when swung will cause the valves to be opened and the seeds to be dropped. It will therefore appear that in order to time the dropping in a manner to correspond with the presentation of the check-blocks to the ground it is simply necessary to arrange tripping mechanism geared to move with the markers and provided with trips suitably spaced and arranged to strike the trip-arms 45 at predetermined intervals to open the valves 40. I therefore mount what may be termed a "dropper-sprocket" 46 upon the shaft 3 at the side of the frame 4 opposite the sprocket 35 and designed, like said sprocket, to be urged into engagement with the clutch-collar 47 by means of a spring 48. The sprocket 46 is geared, as by means of a sprocket-chain 49, with a sprocket 50, keyed upon the marker-shaft 24, so that an interdependent relation is established between the markers and the sprocket-chain 49. The reason for this is that the chain is equipped at predetermined intervals with laterally-extending trips 51, arranged to strike the trip-arm 45 for the purpose of opening the valves 40 and dropping the seed at the instant the check-blocks 27 are presented to the ground to imprint or check the latter. Therefore it will appear that whenever the sprockets 35 and 46 are in engagement with the shaft 3 the traction of the wheel 1 will drive the sprocket to operate the feed mechanism and dropper mechanism in the manner described.

Inasmuch as the sprocket 50 is located somewhat nearer one end of the shaft 24, I prefer to overcome the uneven resistance thus imposed upon the shaft by mounting thereon, adjacent to the bar 13, an evener-sprocket 52, geared, as by a sprocket-chain 53, to a sprocket 54, mounted upon an evener-shaft 55, journaled in suitable bearings carried by the frame-bar 15 and draft-tongue, respectively.

Immediately in advance of the shaft 3 a transverse frame-bar 56 is carried by the bars 8 and 9 of the main frame and in turn supports a rigid bifurcated lever 57, having a spring-latch 58, arranged for engagement with a segmental rack 59, carried by a foot-lever 60, fulcrumed above the frame-bar 56. The foot lever or treadle 60 is provided at its rear end with a foot piece or rest 61, located within convenient reach of the driver's seat 62, and has a loose pivotal connection at its front end with an upstanding slotted connecting-bar 63, bolted at its lower end to the rear extremity of the tongue 17. The loose connection between the bar 63 and the lever 60 is provided in order to prevent the jarring or vibration of the draft-tongue from being imparted to the main frame of the machine upon which the driver is seated. The proper normal positions of the lever and tongue are maintained, however, by a spring 64, encircling the rod 63 and bearing at its opposite ends against the lever 60 and the collar 65, secured upon the rod 63, adjacent to its lower end. By means of this mounting the vibration of the tongue incident to the movement of the draft-animals or caused by the marker-wheels passing over obstructions will be absorbed by the spring 64.

Bearing in mind that the front end of the draft-tongue is supported by the neck-yoke of the draft-animals, it will be obvious that whenever it is desired to discontinue the planting—as, for instance, in turning or in moving the machine from one point of use to another—the desired result may be effected by bearing down upon the rear end of the lever or treadle 60, thereby raising the planter-frame from the ground and tilting in corresponding degree the main frame 4, upon the rear end of which the weight of the driver is imposed. Unless some provision is made for throwing the sprockets 35 and 46 out of gear with the shaft 3 it is evident that the feed and dropper mechanisms would continue to operate even after the planter-frame is elevated out of contact with the ground in the manner stated. I therefore mount in suitable bearings 66 the substantially U-shaped shifters 67 and 68, having their ends disposed in operative proximity to the side faces of the sprockets 35 and 46 and connected, respectively, to shifter-arms 69 and 70, extending inwardly to positions under the rear end of the lever 60. It will now appear that when the rear end of the lever 60 is depressed to elevate the planter-frame from contact with the ground the shifter-arms 69 and 70 will be simultaneously depressed to urge the sprockets 35 and 46 out of engagement with the clutch-collars, and thereby effect the disconnection of the driving-shaft of the machine from the feeding and dropping mechanism. When this reorganization of the machine has been effected, the parts are rigidly retained by the engagement of the spring-latch 58 with the segmental rack carried by the lever 60, and in order to restore the parts to their normal operative positions it is simply necessary to retract the latch and permit the planter-frame to drop back into contact with the ground and the sprockets to be urged by their springs into engagement with the clutch-collars upon the driving-shaft. I also prefer to employ scrapers 71 in proximity to the wheels 1 and 2 and adjustably mounted upon a scraper-shaft 72, journaled at the rear end of the frame 4 and rocked by means of a treadle 73 for the purpose of bringing the scrapers into use when necessary.

From the foregoing it will be observed that I have produced a simple, durable, and efficient check-row planter embodying a construction best calculated to effect the accomplishment of the various objects stated; but while the machine constructed in the manner illustrated and described is believed at this time to be preferable I desire to reserve the right to effect such changes, modifications, and variations thereof as may be properly comprehended within the scope of the protection prayed.

What I claim is—

1. In a planter, the combination with the frame, wheels and driving-shaft, of a hinged runner-frame, a marker-shaft at the front end thereof, rotary markers on said shaft having check-blocks, seedboxes at the rear end of the runner-frame, feed mechanism and dropper mechanism, a feed-shaft and a dropper-shaft, both located at the rear end of the runner-frame, a feed-sprocket and a dropper-sprocket on the driving-shaft, a sprocket-chain between the feed-sprocket and feed-shaft, a second sprocket-chain between the dropper-sprocket and marker-shaft, spaced trips carried by the last-named chain, and a trip-arm on the dropper-shaft for actuation by said trips.

2. In a planter, the combination with a frame, carrying-wheels and driving-shaft, of a planting-frame connected to the main frame, seedboxes carried by the planting-frame, feed mechanism and dropper mechanism in coöperative relation with the feedboxes, means for operating the feed and dropper mechanisms, and means for throwing said mechanisms into or out of gear and for simultaneously depressing or elevating the planting-frame.

3. In a planter, the combination with a frame, carrying-wheels, and a driving-shaft, of a pair of seedboxes, feed mechanism and dropper mechanism, each comprising a shaft independently geared to the driving-shaft, a foot-lever carried by the frame of the machine, means operated by said foot-lever for simultaneously connecting or disconnecting the feed and dropper-shafts to and from the driving-shaft, and a marker-shaft located in advance of the dropper-shaft and geared to the dropper-shaft and driving-shaft respectively.

4. In a planter, the combination with a frame, carrying-wheels and driving-shaft, of markers, seedboxes, feed mechanism and dropper mechanism, of a feed-sprocket mounted on the driving-shaft and geared to the feed mechanism, a dropper-sprocket likewise mounted upon the driving-shaft and operatively related with the dropper mechanism, clutch devices connecting each of the sprockets with the shaft, oscillatory shifters disposed to urge said sprockets laterally to disconnect them from the driving-shaft, and a foot-lever independent of but disposed for the simultaneous actuation of said shifters.

5. In a planter, the combination with a frame, carrying-wheels, a driving-shaft, a marker-shaft and markers, of a pair of seedboxes, dropper-tubes depending from said boxes, valves located in said tubes, a dropper-shaft disposed across the frame, valve-levers carried by said shaft and operatively related to the valves, a trip-arm extending from the dropper-shaft, and a chain geared to the driving-shaft and marker-shaft, and having a series of spaced trips movable in a path obstructed by the trip-arm, whereby the dropper-shaft is vibrated at predetermined intervals to effect the opening of the valves.

6. In a planter, the combination with a frame, carrying-wheels and driving-shaft, of a planting-frame hingedly connected to the main frame, a marker-shaft disposed at the front end of the planting-frame, marker-wheels carried by said shaft and provided with check-blocks, seedboxes carried by the planting-frame, dropper mechanism controlling the deposit of seeds into the furrows, said dropper mechanism comprehending a trip-arm controlling the operation thereof, sprocket-wheels carried by the driving and marker shafts, a sprocket-chain passed around said wheels, and a series of trips carried by said chain and movable in a path obstructed by the trip-arm of the dropper mechanism.

7. In a planter, the combination with a frame, carrying-wheels and driving-shaft, of a planter-frame pivoted to the main frame, a vertically-yielding transversely-disposed marker-shaft disposed at the front end of the planter-frame, marker-wheels carried by said shaft and provided with check-blocks, a pair of seedboxes mounted at the rear end of the planter-frame, dropper-tubes and runners disposed below said seedboxes, valves located in the dropper-tube, a dropper-shaft disposed between the seedboxes and operatively related with said valves, a trip-arm extending from the dropper-shaft, sprocket-wheels carried by the main shaft and marker-shaft, respectively, a sprocket-chain passed over said wheels and provided with a series of spaced trips disposed for the actuation of the trip-arm, a shifter disposed to effect the lateral movement of the dropper-sprocket, and a foot-lever disposed to simultaneously actuate said shifter and elevate the planter-frame.

8. In a planter, the combination with a main frame, carrying-wheels and driving-shaft, of a planting-frame hinged to the main frame, wheels supporting the front end of said planting-frame, a draft-pole connected to the planting-frame and extended below the main frame, a foot-lever mounted upon the main frame, a loose connection intermediate of said foot-lever and draft-pole, and a spring interposed between said elements and designed to yieldingly sustain them in normally-separated positions.

9. In a planter, the combination with a main or wheel frame, an axle and carrying-wheels, of seedboxes, feed mechanism and dropper mechanism, separate gearing intermediate of each of said mechanisms and the axle, a pair of oscillatory shifters disposed to control the operative relation of the axle with the dropper and feeding mechanisms, respectively, and means for operating said shifters simultaneously.

10. In a planter, the combination with a main or wheel frame, an axle and carrying-wheels, of a planting or runner frame hinged to the main frame, marker-wheels supporting the runner-frame, seedboxes carried by said frame, feed and dropper sprockets mounted on the axle, feed mechanism and dropping mechanism geared to said sprockets, a pair of oscillatory shifters disposed to shift the sprockets laterally and to effect their operative disconnection from the axle, and a foot-lever arranged to raise and lower the runners and to operate the shifters.

In testimony that I claim the foregoing as my own I have hereto affixed my signature in the presence of two witnesses.

C. C. LEARY.

Witnesses:
JOHN H. SIGGERS,
LOUIS G. JULIHN.